March 3, 1970   M. L. POLANYI ET AL   3,498,286
CATHETERS
Filed Sept. 21, 1966
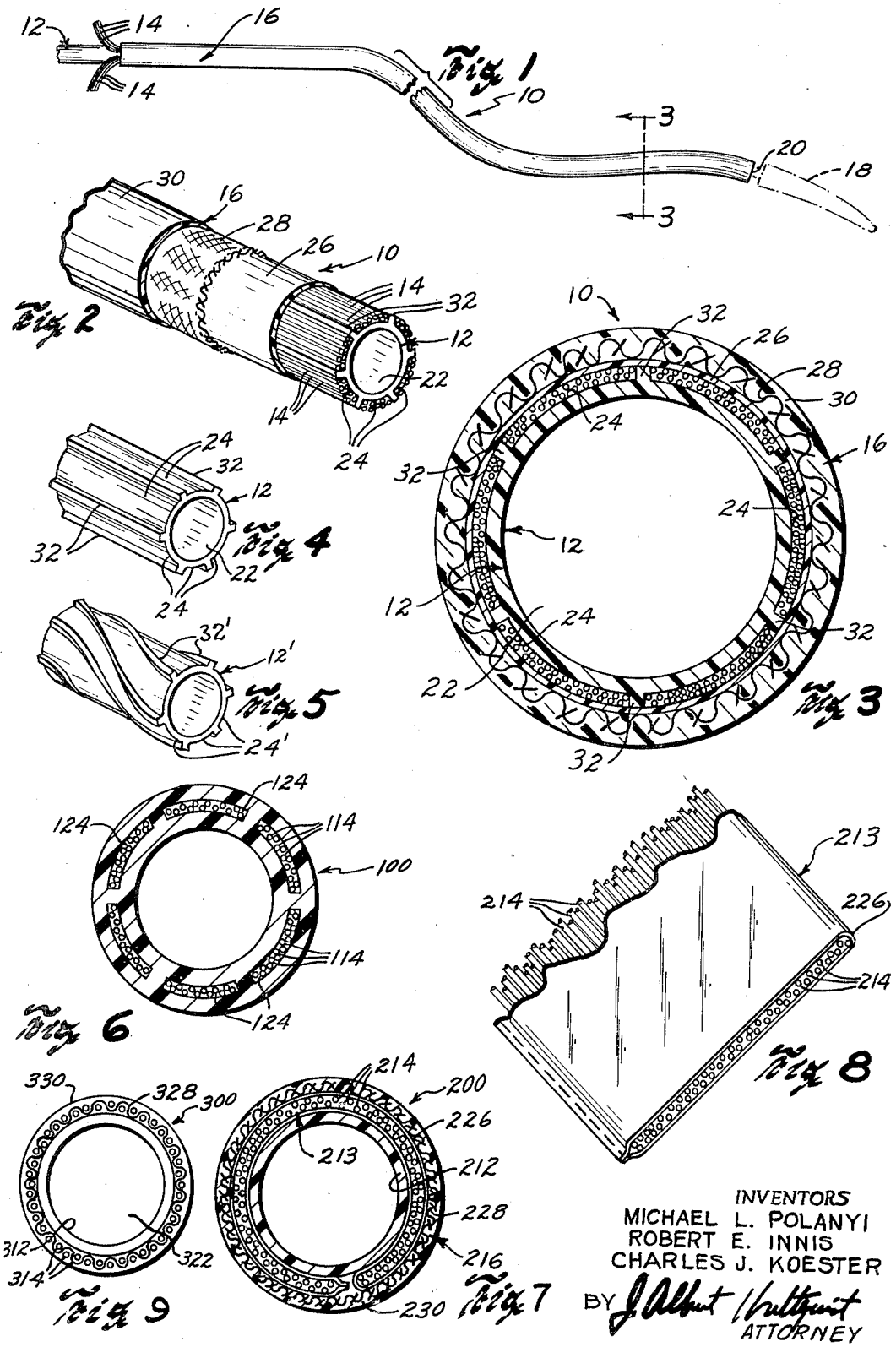
INVENTORS
MICHAEL L. POLANYI
ROBERT E. INNIS
CHARLES J. KOESTER
BY J. Albert Vulthuut
ATTORNEY

United States Patent Office 3,498,286
Patented Mar. 3, 1970

3,498,286
CATHETERS
Michael L. Polanyi, Webster, and Robert E. Innis, Southbridge, Mass., and Charles J. Koester, South Woodstock, Conn., assignors, by mesne assignments, to American Optical Corporation, a corporation of Delaware
Filed Sept. 21, 1966, Ser. No. 580,963
Int. Cl. A61b 5/02; G02b 5/14
U.S. Cl. 128—2                              10 Claims

ABSTRACT OF THE DISCLOSURE

An elongated flexible catheter for insertion into the cardiovascular system for in vivo examination of intravascular and intracardiac environments, having a clear lumen therethrough defined by an annular wall having smooth inner and outer surfaces between which long and slender light-conducting fibers are extended from one end to the other of the catheter.

---

This invention relates to improvements in catheters and more particularly to a form thereof intended for insertion into the cardiovascular system for in vivo examination of intravascular and intracardiac environments.

The present invention is especially concerned with the incorporation of light-conducting means in such catheters without undue encroachment upon statistical requirements for optimum inner and outer diametral sizes and flexibility of the devices.

Accordingly, an object of the invention is to provide a catheter of novel construction in which the foregoing is achieved simply, efficaciously and economically.

To attain the aforesaid object and others which may appear from the following detailed description, we provide, as light-conducting means in a catheter, a number of thin and highly flexible light-conducting fibers. The fibers are placed in the wall of the catheter and extend longitudinally thereof from one of its ends to the other. They are located intermediate of inner and outer sides of the catheter wall thereby leaving the catheter lumen unobstructed and immediately available for use in introducing media into the cardiovascular system, obtaining specimens therefrom or for measuring intravascular and intracardiac blood pressure according to recognized catheterization techniques.

The light-conducting fibers, being considerable in number but of very small individual cross-sectional size and distributed concentrically about the catheter lumen, permit the transmission of large amounts of afferent and/or efferent light through the catheter while occupying only a relatively small cross-sectional segment of the catheter wall. Thus, a dual purpose catheter is provided which may be used to simultaneously measure both the oxygen saturation and pressure of blood in a cardiovascular system by utilizing its light-conducting fibers and lumen respectively.

Oxygen saturation measurements may be made by employing a preselected number of the light-conducting fibers as means for conducting alternating pulses of near monochromatic different wavelengths of light (e.g. 660$\mu$ and 805$\mu$ respectively) afferently through the catheter from its proximal end into the cardiovascular system. The remaining number of fibers in the catheter will then receive portions of such light diffusely reflected by the blood in said system and conduct this light efferently through the catheter to its proximal end for photoelectric analysis according to which determinations of the blood's oxygen saturation are made.

For those interested in greater detail of the aforementioned technique of measuring the oxygen saturation of blood in vivo, reference may be made to U.S. Patents Nos. 3,068,739 and 3,068,742. The technique of measuring blood oxygen saturation is also applicable to dye dilution examination as explained in these patents.

It should be understood, however, that according to principles of this invention the light-conducting fibers being disposed intermediately of the inner and outer sides of the catheter wall and occupying only a small or relatively thin segment thereof make possible the provision of not only a smooth walled unobstructed lumen but one of relatively large diameter for a given size (i.e. outer diametral dimension) of catheter. This not only offers the advantage of the catheter lumen being easy to clean and/or autoclave but permits the use of a relatively large column of fluid in the catheter by means of which measuremetns of blood pressure may be made in conventional fashion. As it is well known in the art, larger columns of fluid in catheters respond more readily and accurately to pulsing of the circulatory system, i.e. with less damping of the pulse frequencies, in that the larger columns have less area of frictional engagement with catheter walls on a basis of cross-sectional area, than do smaller columns of fluid.

The light-conducting fibers, being individually highly flexible, impose little if any restriction upon the degree of flexibility of the present form of catheters as compared to non-light-conducting cardiovascular catheters of conventional design. The fibers may be extended either parallel to the axis of the catheter or spirally thereof. The latter arrangement facilitates bending.

The present invention will be more fully understood by reference to the following detailed description which is accompanied by a drawing in which:

FIG. 1 illustrates, in elevation, an embodiment of the present invention;

FIG. 2 is an enlarged fragmentary perspective view of the improved light-conducting catheter of our invention wherein portions of its wall are broken away at various levels so as to illustrate the nature of its constructon;

FIG. 3 is a greatly enlarged cross-sectional view of the catheter taken on line 3—3 of FIG. 1;

FIG. 4 illustrates separately and in perspective a tubular component of said catheter;

FIG. 5 illustrates in perspective a modification of said tubular component;

FIG. 6 is an enlarged transverse cross-sectional view of another embodiment of the invention;

FIG. 7 is an enlarged transverse cross-sectional view of still another embodiment of the invention;

FIG. 8 is a fragmentary perspective view of a prefabricated light-conducting component used in the construction of said last mentioned embodiment of the invention; and FIG. 9 is an enlarged end view of a further modification of the present invention.

Referring now to FIG. 1, there is shown catheter 10 comprising inner tube 12, a number of light-conducting fibers 14 extending longitudinally from adjacent one end of tube 12 to its opposite end and sheathing 16. Tip 18, which actually forms no part of the present invention, is shown by dot-dash outline only to illustrate that such means may be applied to the blunt distal end 20 of our catheter when it is desired to prevent its coming into direct contact with the endocardium or vascular walls during catheterization. Various forms of longer or shorter flexible tips 18 or wire cages and the like (not shown) may be used according to practitioner preference or the catheter may be used without any such appendage. In all cases, however, the distal ends of fibers 14 and the corresponding open end of tube 12 must be exposed to the blood at all times during catheterization.

As shown in more detail in FIGS. 2–4, inner tube 12 of catheter 10 which forms lumen 22 is externally splined and fibers 14 are placed longitudinally in each of channels 24. The combination of tube 12 and fibers 14 is wrapped with a thin covering 26 of plastic material over which sheathing 16, comprised of knitted sleeve 28 and external plastic coating 30, is applied.

Fibers 14 are usually placed randomly in each of grooves 24 but may, if desired, be arranged with their corresponding opposite ends in congruity so as to be capable of transmitting image-forming light. Fibers 14 each comprise a flexible transparent core formed of optical glass or a suitable plastic material having a relatively high refractive index coated with a thin layer of plastic or glass having a lower refractive index. Thus, light caused to enter one end of any one fiber will be conducted by internal reflection to its opposite end independently of the other fibers. Reference in this specification to light-conducting fibers is intended to include fibers which perform the analogous function when subjected to electromagnetic wave energy having properties equivalent to those of visible light notwithstanding the fact that such wave energy is outside the range to which the human eye is sensitive.

Tube 12 is formed of a flexible plastic material such as nylon, Teflon or a rubber compound. Covering 26 comprises either a thin sheet of plastic material wrapped around the tube 12-fiber 14 combination with its edges brought together and heat sealed or it may be a relatively narrow strip of similar material, e.g. adhesive Mylar tape, wrapped spirally along the length of the combination.

Sleeve 28 is formed of nylon or Dacron thread or the equivalent thereof which is knitted relatively tightly over film 26 and sprayed, dipped or similarly treated with a flexible plastic or rubber material to form a smooth seamless exterior coating 30 of sheathing 16. Covering 26 holds fibers 14 in their place upon tube 12 while sheathing 16 is being formed thereover and also prevents possible fouling of fibers 14 by amounts of the material of coating 30 which happen to penetrate completely through the weave of knitted sleeve 28.

A typical cardiovascular type catheter would be approximately 125 centimeters long having an outer diameter of approximately 2 millimeters and a lumen of from 1 to 1½ millimeter in diameter. It should be understood, however, that catheters of larger or even smaller cross-sectional dimensions and lengths may be formed according to principles of this invention and that their use is not in any sense limited to the medical field.

Furthermore, our catheters may be formed to any desired cross-sectional shape. While the illustrated circular configuration permits lateral flexing of a catheter in all directions with substantially equal facility, it may be desirable in some applications to limit the flexibility of a catheter in certain lateral directions. By making the catheter oval, for example, its resistance to lateral flexing in one direction will be greater than in another direction.

In the above-described construction, splines 32 on tube 12 prevent the closing of grooves 24 and possible crushing or pinching together of fiber 14 during flexing of catheter 10. For optimum support in this regard, a minimum of six splines is recommended. A greater number thereof will reduce the flexibility of the catheter as a whole and obviously further limit the number of fibers which can be used for a given depth of channeling between the splines. However, as already mentioned, the flexibility of any such construction may be enhanced by spiraling the fibers and splines 32 along the length of the catheter. In FIG. 5 there is illustrated tube 12' having spiraled splines 32' and grooves 24'. In this embodiment of the invention tube 12' would simply be substituted for tube 12 whereupon fibers 14 would be placed in grooves 24', wrapped with covering 26 and sheathed with sleeve 28 and outer coating 30.

Another embodiment of the invention is illustrated in FIG. 6 wherein catheter 100 comprises a length of extruded plastic or rubber tubing of desired outer diameter and wall thickness having a number of spaced concentric channels 124 between inner and outer sides of the wall. Channels 124 extend from one end to the other of the catheter. Light-conducting fibers 114 are threaded individually or in groups through channels 124 to complete the structure.

In still another aspect of the present invention catheter 200 (FIG. 7) comprises inner tube 212, blanket 213 of fibers 214 wrapped around tube 212 and sheathing 216. Sheathing 216 comprises knitted sleeve 228 and outer plastic coating 230 each of which is identical to the already-described knitted sleeve 28 and coating 30 respectively. Blanket 213 may be formed as illustrated in FIG. 8 by placing a multiplicity of light-conducting fibers 114 in approximately parallel side-by-side relationship within an envelope or wrapping 226 of the same or a similar type of plastic material as that used to form covering 26.

Interstices between and around the fibers and all other openings between inner and outer sides of distal ends of the walls of the aforementioned catheters are preferably all sealed with a plastic or epoxy resin or the like so as to prevent fluids and/or foreign matter from entering thereinto. Proximal ends of the catheter walls may be similarly sealed if desired. In all cases, however, corresponding opposite ends of the light-conducting fibers are left exposed.

Another embodiment of the invention is illustrated in FIG. 9 wherein catheter 300 comprises inner tube 312 which forms lumen 322. Woven sleeve 328 whose warp or woof or both are formed of thin and highly flexible light-conducting fibers 314 is knitted over or otherwise placed exteriorly upon tube 312. Corresponding opposite ends of particular fibers forming either the warp or woof, or some of each, are exposed at opposite ends of the catheter for use in conducting light therethrough according to the aforementioned principles of the invention. Sleeve 328 is coated and/or impregnated with a flexible plastic or rubber composition to form smooth seamless exterior coating 330. The material of coating 330 preferably caused to penetrate completely through the weave of sleeve 328 at least adjacent the distal end of catheter 300 so as to seal all interstices in the catheter wall at such end.

It will be noted that in all of the above-described embodiments of our invention, each catheter comprises a great number of light-conducting fibers disposed intermediately of inner and outer sides of its wall leaving the catheter lumen completely unobstructed.

We claim:

1. A catheter for insertion into the cardiovascular system for in vivo examination of intravascular and intracardiac environments comprising an elongated flexible tubular structure having a clear lumen therethrough defined by an annular wall having smooth inner and outer sides, a multiplicity of long and thin highly flexible light-conducting fibers extending from adjacent one end to the other end of said wall intermediately of said inner and outer sides thereof, said fibers each having a core formed of relatively high refractive index light-conducting material coated with a material of lower refractive index whereby said fibers will conduct light by internal reflection each independently of the other from one end to the other of said catheter.

2. A catheter as recited in claim 1 wherein said wall comprises an inner tube of flexible material against the outer side of which said fibers are positioned circumferentially in a number of layers and a flexible sheathing surrounding the combination of said inner tube and layers of fibers.

3. A catheter as recited in claim 2 wherein said sheathing comprises a knitted sleeve having an external coating of flexible plastic material.

4. A catheter as recited in claim 2 wherein said inner tube is externally splined to form circumferentially spaced grooves therealong and said fibers are placed longitudinally in said grooves.

5. A catheter as recited in claim 4 wherein said splining and corresponding grooves are spiraled along the length of said inner tube.

6. A catheter as recited in claim 2 wherein said fibers are contained within an envelope of plastic sheet material and the whole is wrapped circumferentially about said inner tube.

7. A catheter as recited in claim 2 wherein said inner tube and fibers are wrapped with a thin layer of plastic over which said sheathing is applied.

8. A catheter as recited in claim 1 wherein said wall is formed entirely of a homogeneous flexible material having a number of circumferentially disposed channels extending longitudinally therethrough intermediately of its inner and outer sides and said fibers are disposed longitudinally in said channels.

9. A catheter for insertion into the cardiovascular system for in vivo examination of intravascular and intracardiac environments comprising an elongated flexible tubular structure having a clear lumen therethrough defined by an annular wall having smooth inner and outer surfaces, said wall including an inner tube of flexible material, an intermediate sleeve of woven fibers surrounding said tube and an outer coating of flexible plastic material, said sleeve having a warp and woof at least one of which is formed of light-conducting fibers, each of said light-conducting fibers having a core formed of relatively high refractive index light-conducting material coated with a material of lower refractive index whereby said fibers will conduct light by internal reflection each independently of the other from one end to the other end of said catheter.

10. A catheter according to claim 9 wherein the weave of said sleeve is impregnated with the material of said outer coating.

References Cited

UNITED STATES PATENTS

| | | | |
|---|---|---|---|
| 3,123,066 | 3/1964 | Brumley | 128—2 |
| 3,068,739 | 12/1962 | Hicks et al. | 128—397 X |
| 3,132,646 | 5/1964 | Hett | 128—6 |
| 3,215,135 | 11/1965 | Franke | 128—2.05 |
| 3,294,085 | 12/1966 | Wallace | 128—6 |

DALTON L. TRULUCK, Primary Examiner

U.S. Cl. X.R.

128—348; 350—96